(12) United States Patent
Zhang

(10) Patent No.: US 10,562,279 B2
(45) Date of Patent: Feb. 18, 2020

(54) HIGH STABLE AND ENVIRONMENT-FRIENDLY TWO-LAYER PARQUET AND PRODUCTION METHOD THEREOF

(71) Applicant: Zhejiang Fuma Floor Heating Science & Technology Co., Ltd, Huzhou (CN)

(72) Inventor: Yong Zhang, Huzhou (CN)

(73) Assignee: ZHEJIANG FUMA FLOOR HEATING SCIENCE & TECHNOLOGY CO., LTD, Huzhou (CN)

( * ) Notice: Subject to any disclaimer, the term of this patent is extended or adjusted under 35 U.S.C. 154(b) by 462 days.

(21) Appl. No.: 15/412,011

(22) Filed: Jan. 22, 2017

(65) Prior Publication Data

US 2017/0282505 A1 Oct. 5, 2017

(30) Foreign Application Priority Data

Mar. 31, 2016 (CN) .......................... 2016 1 0196027

(51) Int. Cl.
| | |
|---|---|
| B32B 21/04 | (2006.01) |
| B32B 7/12 | (2006.01) |
| B32B 3/06 | (2006.01) |
| B32B 37/12 | (2006.01) |
| B32B 38/00 | (2006.01) |
| E04F 15/04 | (2006.01) |
| E04F 15/022 | (2006.01) |

(52) U.S. Cl.
CPC .............. *B32B 21/042* (2013.01); *B32B 3/06* (2013.01); *B32B 7/12* (2013.01); *B32B 37/12* (2013.01); *B32B 38/0004* (2013.01); *E04F 15/022* (2013.01); *E04F 15/045* (2013.01); *E04F 15/048* (2013.01); *B32B 2419/00* (2013.01)

(58) Field of Classification Search
CPC .......... B32B 21/042; B32B 7/03; B32B 3/06; B32B 3/14; B32B 7/12; B32B 21/13; B32B 21/14; B32B 37/12; B32B 38/0004; E04F 15/022; E04F 15/045; E04F 15/048
USPC ....................................................... 428/537.1
See application file for complete search history.

(56) References Cited

U.S. PATENT DOCUMENTS

| | | | | |
|---|---|---|---|---|
| 2006/0162851 A1* | 7/2006 | Engel | ......................... | B27L 5/00 156/153 |
| 2008/0187723 A1* | 8/2008 | Miclo | ................... | B44C 5/0492 428/192 |
| 2008/0213532 A1* | 9/2008 | Engel | ........................ | B27L 5/00 428/106 |

FOREIGN PATENT DOCUMENTS

| | | | |
|---|---|---|---|
| CN | 105672621 | * | 1/2016 |
| CN | 106193526 | * | 12/2016 |

* cited by examiner

*Primary Examiner* — Chinessa T. Golden
(74) *Attorney, Agent, or Firm* — Wayne & Ken, LLC; Tony Hom

(57) ABSTRACT

The invention discloses a high stable and environment-friendly two-layer parquet and a production method thereof. The parquet comprises a face board and multiple solid wood boards below the face board, the solid wood boards comprise multiple solid wood strips inserted side by side; any adjacent two solid wood strips of the same solid wood board are arranged tightly and alternately, and the face board and solid wood boards are closely bonded with each other by an adhesive. The length directions of the solid wood strips of any adjacent two solid wood boards are vertical to each other; and the length direction of the solid wood strips of the solid wood boards at the two ends of the parquet is vertical to the length direction of the parquet. The invention can effectively reduce the use of high-quality solid wood, save the wood resources and has high stability and high strength.

7 Claims, 4 Drawing Sheets

HIGH STABLE AND ENVIRONMENT-FRIENDLY TWO-LAYER PARQUET AND PRODUCTION METHOD THEREOF

CROSS-REFERENCE TO RELATED APPLICATIONS

This application claims priority to Chinese Patent Application No. 201610196027.1 with a filing date of Mar. 31, 2016, designating the United States, now pending. The content of the aforementioned applications, including any intervening amendments thereto, are incorporated herein by reference.

TECHNICAL FIELD

The present invention relates to a wood floor and a production method thereof, and more specifically, to a high stable and environment friendly two-layer parquet and a production method thereof.

BACKGROUND OF THE PRESENT INVENTION

With rapid development of economy and gradually increase of human's living standard, the consumption of woods is further increased, which results in rising price of wooden products. Especially those woods with good quality will be exhausted as time goes on due to slow growing speed and heavy deforestation. Currently, most consumers are increasingly seeking life quality, and there is more and more strong demand for solid wood floor. The only solution to solve the problem is to find new solution to replace solid wood with excellent quality. One common solution in our society is to adopt other materials to manufacture composite floor board, however, the quality of most composite floor boards cannot be compared with the solid wood floors, that is, existing composite floor boards cannot reach the strength and stability of the solid wood floors.

SUMMARY OF PRESENT INVENTION

The purpose of the present invention is to provide a high stable and environment-friendly two-layer parquet and a production method thereof. The present invention can effectively reduce the use of high-quality solid wood, save the wood resources and has the advantages of high stability and high strength.

To solve above technical problems, the present invention provides a high stable and environment-friendly two-layer parquet. The high stable and environment-friendly two-layer parquet comprises a face board and a plurality of solid wood boards provided below the face board, the plurality of solid wood boards comprise a plurality of solid wood strips inserted with each other side by side; adjacent two solid wood strips of a same solid wood board are arranged tightly and alternately, and the face board and the plurality of solid wood boards are closely bonded with each other by an adhesive.

Further, a length direction of the solid wood strips of any adjacent two solid wood boards below the face board are vertical to each other; and a length direction of the solid wood strips of the solid wood boards at two ends of the parquet is vertical to a length direction of the parquet.

Another preferred scheme is any adjacent two solid wood boards below the face board are inserted with each other tightly and alternately by the solid strips.

In above-mentioned high stable and environment-friendly two-layer parquet, to further increase the stability of the parquet, a width of the solid wood strips is 3~5 mm and a length is 10~50 mm.

In above-mentioned high stable and environment-friendly two-layer parquet, the solid wood strips are obtained by a leftover material after cutting fast growing wood, second-class small firewood or timber.

In above-mentioned high stable and environment-friendly two-layer parquet, the thickness of the face board is 1~6 mm and the thickness of the solid wood boards is 8~15 mm.

An engaged groove and bulge is provided on at least two edge of the high stable and environment-friendly two-layer parquet;

A preparation method of the high stable and environment-friendly two-layer parquet comprises following steps:
  a. obtaining solid wood strips;
  b. inserting a plurality of solid wood strips side by side and splicing into solid wood boards, and coating an adhesive between two adjacent solid wood strips;
  c. cutting the solid wood boards;
  d. splicing the solid wood boards obtained in step b or step c, coating the adhesive on a contact surface of the face board and the spliced solid wood boards, and sticking a face board onto the solid wood boards;
  e. forming an engaged groove and bulge on at least two edges of the high stable and environment-friendly two-layer parquet; and
  f. carrying out a spraying treatment on the surface of the face board.

Compared with the prior art, the beneficial effects of the present invention are as follows:

1. The invention is a two-layer composite structure combined by solid wood boards with different directions and face board, which has higher structure stability and no easily buckling deformation no matter the length direction or width direction of floors, and compared with common composite floors, the invention has higher strength and is not easily to be broken.

2. The solid wood strips of the invention are obtained by leftover materials after cutting fast-growing wood, second-class small firewood or timber, so that more fast-growing woods can be reserved, which can reach higher performance, thereby effectively reducing the use of high-quality solid wood and saving the wood resources.

3. The face board can be composite materials or thinner solid woods, which can save wood resources and reach quality and effect of solid woods.

4. Any adjacent two solid wood boards below the face board are inserted with each other tightly and alternately by the solid strips, so that the solid wood boards have higher strength and are not easily to be broken.

DETAILED DESCRIPTION OF PREFERRED EMBODIMENTS

The present invention is further described in combination with drawings and embodiments.

Embodiment 1

Figure 1:
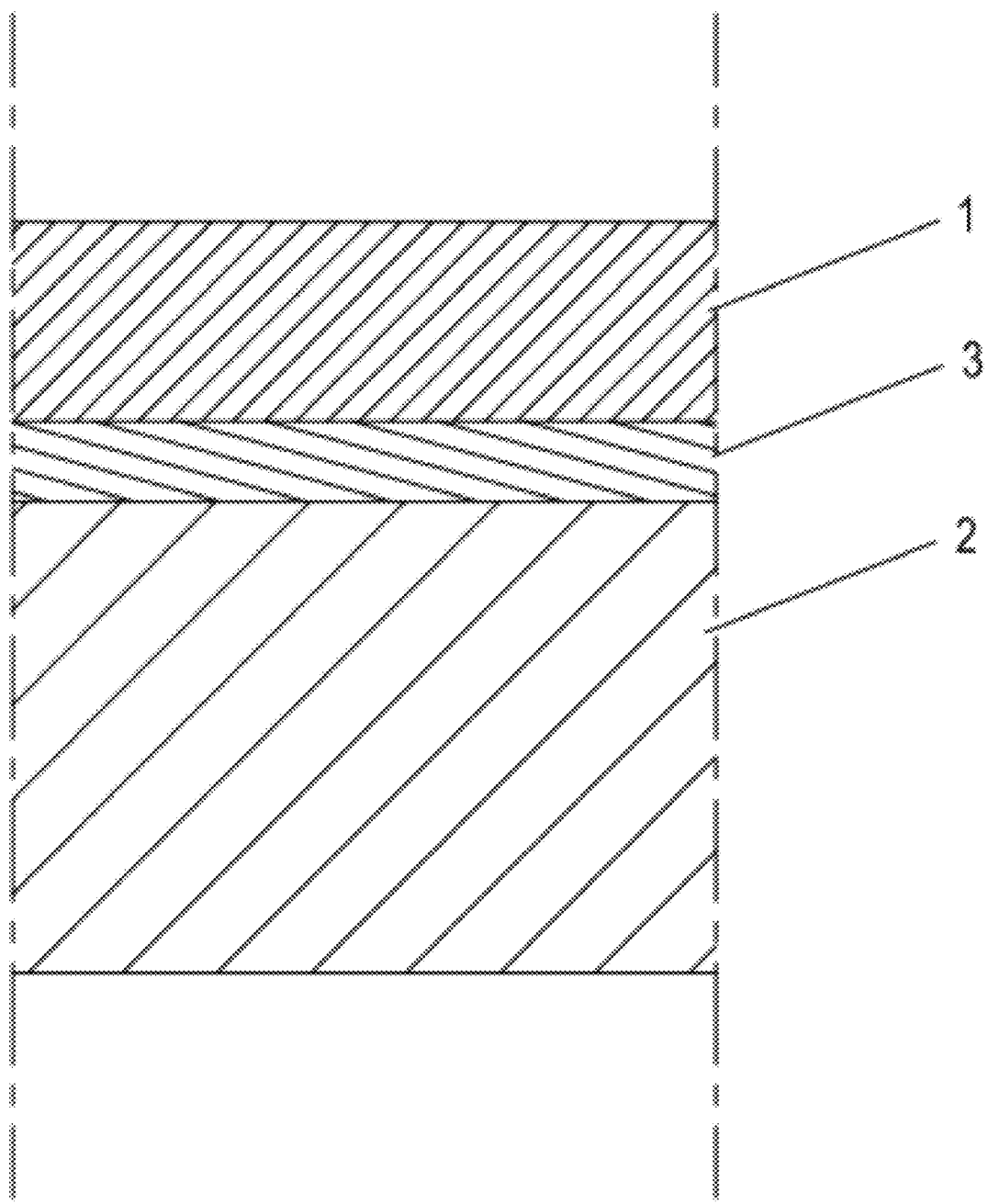
FIG. 1 is a cross section structure diagram of the invention.
Figure 2:
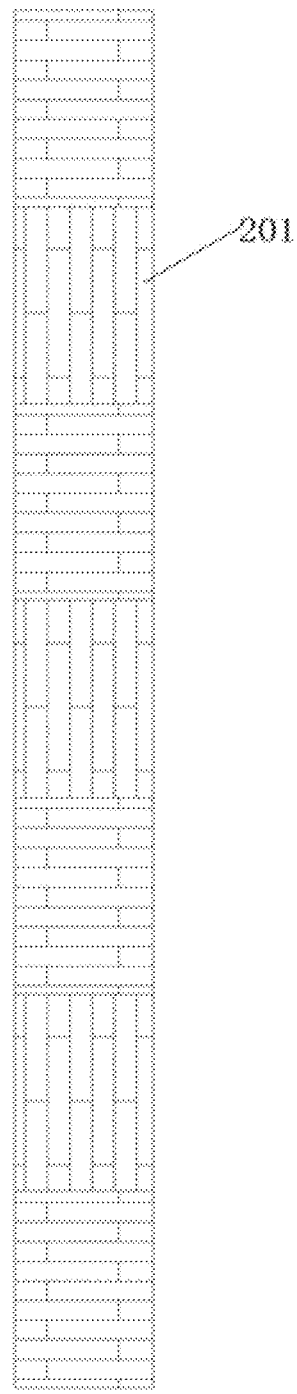
FIG. 2 is a structure diagram of embodiment 1.
Figure 4:
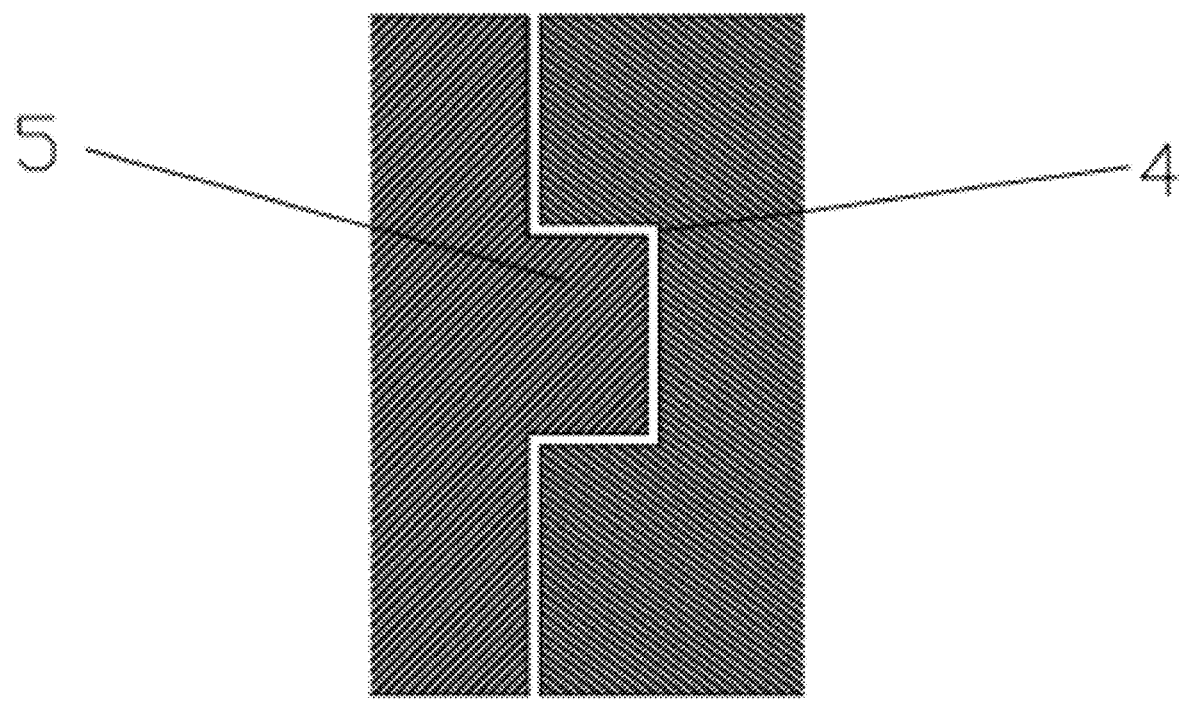
FIG. 4 is a diagram of pavement and engagement of composite floors.

As shown in FIG. 1, FIG. 2 and FIG. 4, a high stable and environment-friendly two-layer parquet comprises a face board (1) and a plurality of solid wood boards (2) provided below the face board (1), wherein the plurality of solid wood boards (2) comprise a plurality of solid wood strips (201) inserted with each other side by side: adjacent two solid wood strips (201) of a same solid wood board (2) are arranged tightly and alternately, and the face board (1) and the plurality of solid wood boards (2) are closely bonded with each other by an adhesive (3), an engaged groove (4) or bulge (5) are provided on at least two edges of the high stable and environment-friendly two-layer parquet. A length direction of the solid wood strips (2) of any adjacent two solid wood boards below the face board (1) are vertical to each other; and a length direction of the solid wood strips (201) of the solid wood boards (2) at two ends of the parquet is vertical to the length direction of the parquet. A width of the solid wood strips is 3~5 cm, and a length 0~50 cm. The solid wood strips (201) are fast growing woods. The thickness of the face board (1) is 1~6 mm and the thickness of the solid wood boards is 8~15 mm. An engaged groove (4) and bulge (5) are provided on at least two edges of the high stable and environment-friendly two-layer parquet for tight and smooth between composite floors;

Embodiment 2

Figure 3:
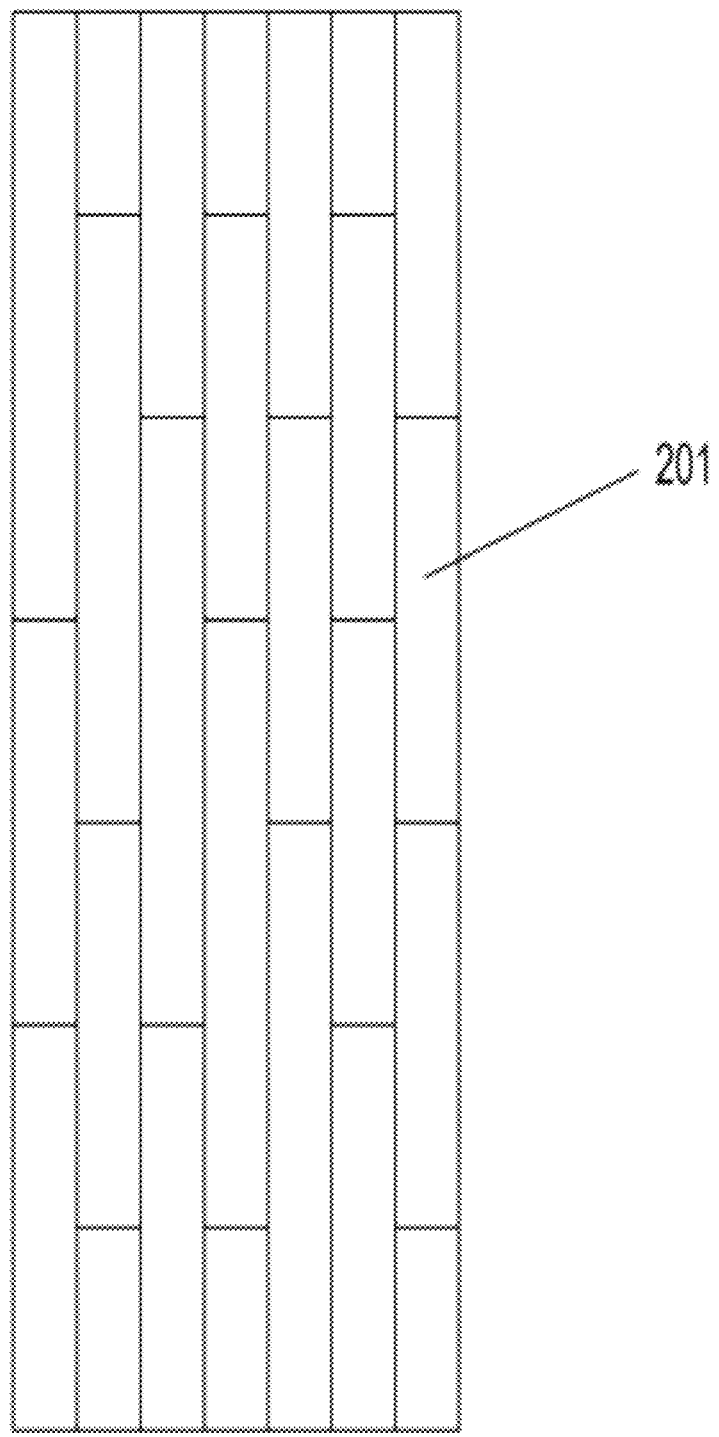
FIG. 3 is a structure diagram of embodiment 2.

As shown in FIG. 1 and FIG. 3, the difference between embodiment 2 and embodiment 1 is that any adjacent two solid wood boards (2) below the face board are inserted with each other tightly and alternately by the solid strips, and other similarities are not repeated herein.

A preparation method of the high stable and environment-friendly two-layer parquet comprises following steps:

a. obtaining solid wood strips (201);

b. inserting a plurality of solid wood strips (201) with each other side by side and splicing into solid wood boards (2); and coating an adhesive (3) between two adjacent solid wood strips (201);

c. cutting the solid wood boards (2);

d. splicing the solid wood boards (2) obtained in step b or step c, coating the adhesive (3) on the spliced solid wood boards (2), and sticking a face board (1) onto the solid wood boards (2);

e. forming an engaged groove (4) and bulge (5) on at least two edges of the high stable and environment-friendly two-layer parquet; and f. carrying out a spraying treatment on the surface of the face board (1).

I claim:

1. A two-layer parquet, comprising a face board and a plurality of solid wood boards provided below the face board; wherein each solid wood board comprises a plurality of solid wood strips inserted with each other side by side; adjacent two solid wood strips of the same solid wood board are arranged tightly and alternately; and the face board is closely bonded with respective solid wood boards by an adhesive, an engaged groove and a bulge are provided on at least two edges of the two-layer parquet.

2. The two-layer parquet of claim 1, wherein a length direction of the plurality of solid wood strips of any adjacent two solid wood boards is vertical to each other; and a length direction of the solid wood strips of the solid wood boards at two ends of the two-layer parquet is vertical to a length direction of the two-layer parquet.

3. The two-layer parquet of claim 1, wherein adjacent two solid wood boards are inserted with each other tightly and alternately by the solid wood strips.

4. The two-layer parquet of claim 1, wherein a width of each solid wood strips is 3~5 cm, and a length of each solid wood strip is 10~50 cm.

5. The two-layer parquet of claim 1, wherein the solid wood strips are obtained from a leftover material formed from the cutting of a fast-growing wood, a second-class small firewood or a timber.

6. The two-layer parquet of claim 1, wherein a thickness of the face board is 1~6 mm, and a thickness of each solid wood board is 8~15 mm.

7. A method of producing the two-layer parquet according to claim 1, comprising:

a. obtaining a plurality of solid wood strips; b. inserting the solid wood strips with each other side by side followed by splicing into a plurality of solid wood boards; and coating an adhesive between two adjacent solid wood strips:

c. cutting the solid wood boards;

d. splicing the solid wood boards obtained in step b or step c, coating the adhesive on a contact surface of a face board (1) and the spliced solid wood board, and sticking the face board onto the spliced solid wood board;

e. forming an engaged groove and a bulge on at least two edges of the two-layer parquet: and f. treating a surface of the face board by spraying.

* * * * *